March 17, 1953    M. P. REHORN    2,631,496
STEREOSCOPIC VIEWING METHOD AND APPARATUS
Filed Aug. 8, 1947    4 Sheets-Sheet 1

Inventor
Miles P. Rehorn
John F. Rule
Attorney

March 17, 1953 M. P. REHORN 2,631,496
STEREOSCOPIC VIEWING METHOD AND APPARATUS
Filed Aug. 8, 1947 4 Sheets-Sheet 2

Inventor
Miles P. Rehorn
By John F. Rule.
Attorney

March 17, 1953 M. P. REHORN 2,631,496
STEREOSCOPIC VIEWING METHOD AND APPARATUS
Filed Aug. 8, 1947 4 Sheets-Sheet 3
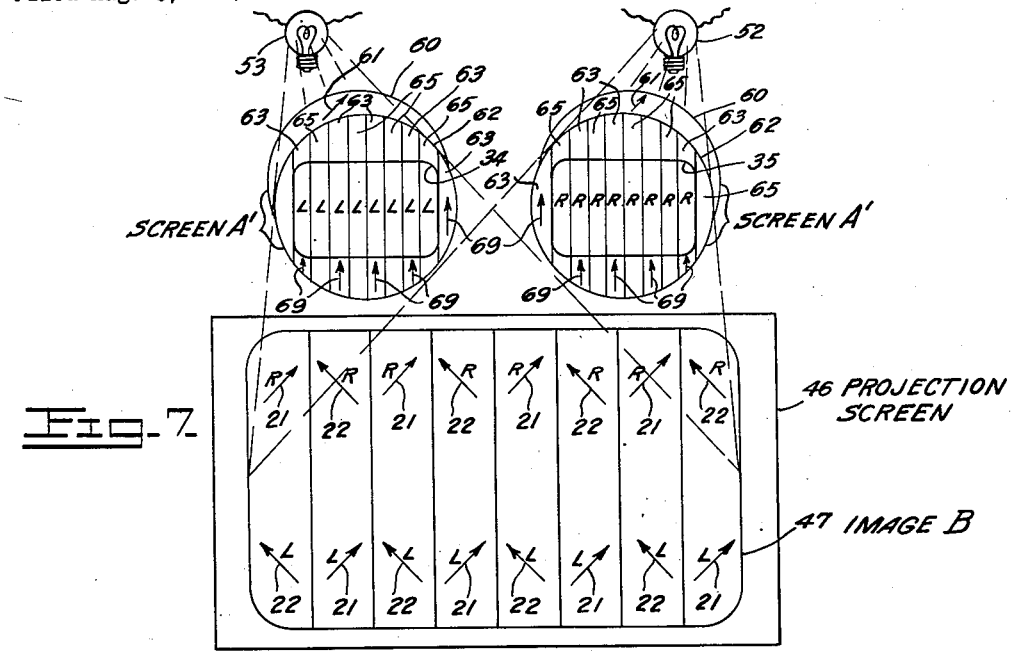
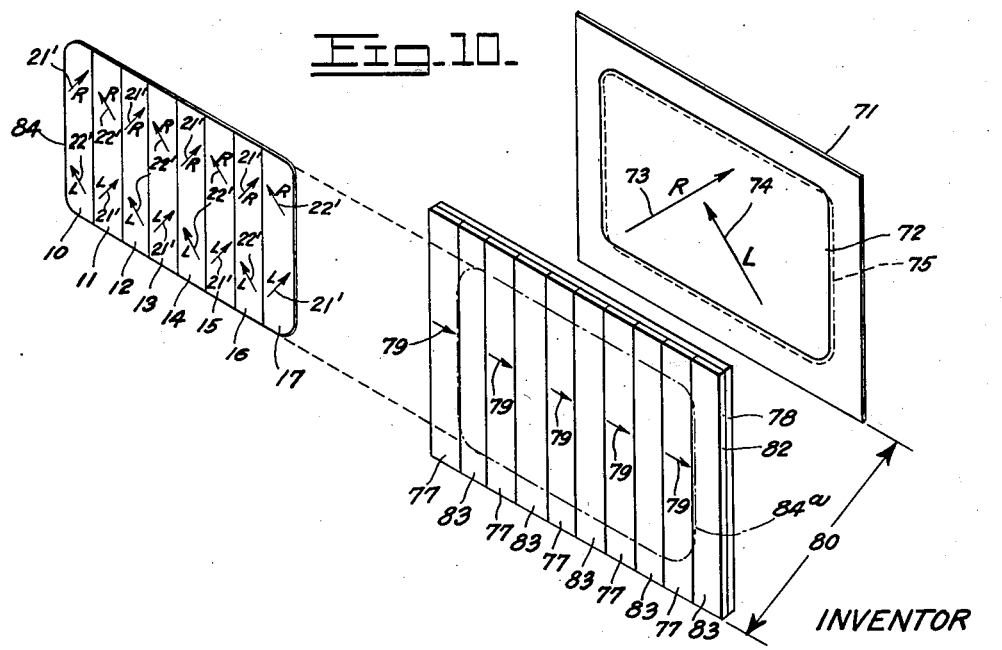
INVENTOR
Miles P. Rehorn
By John F. Rule
Attorney

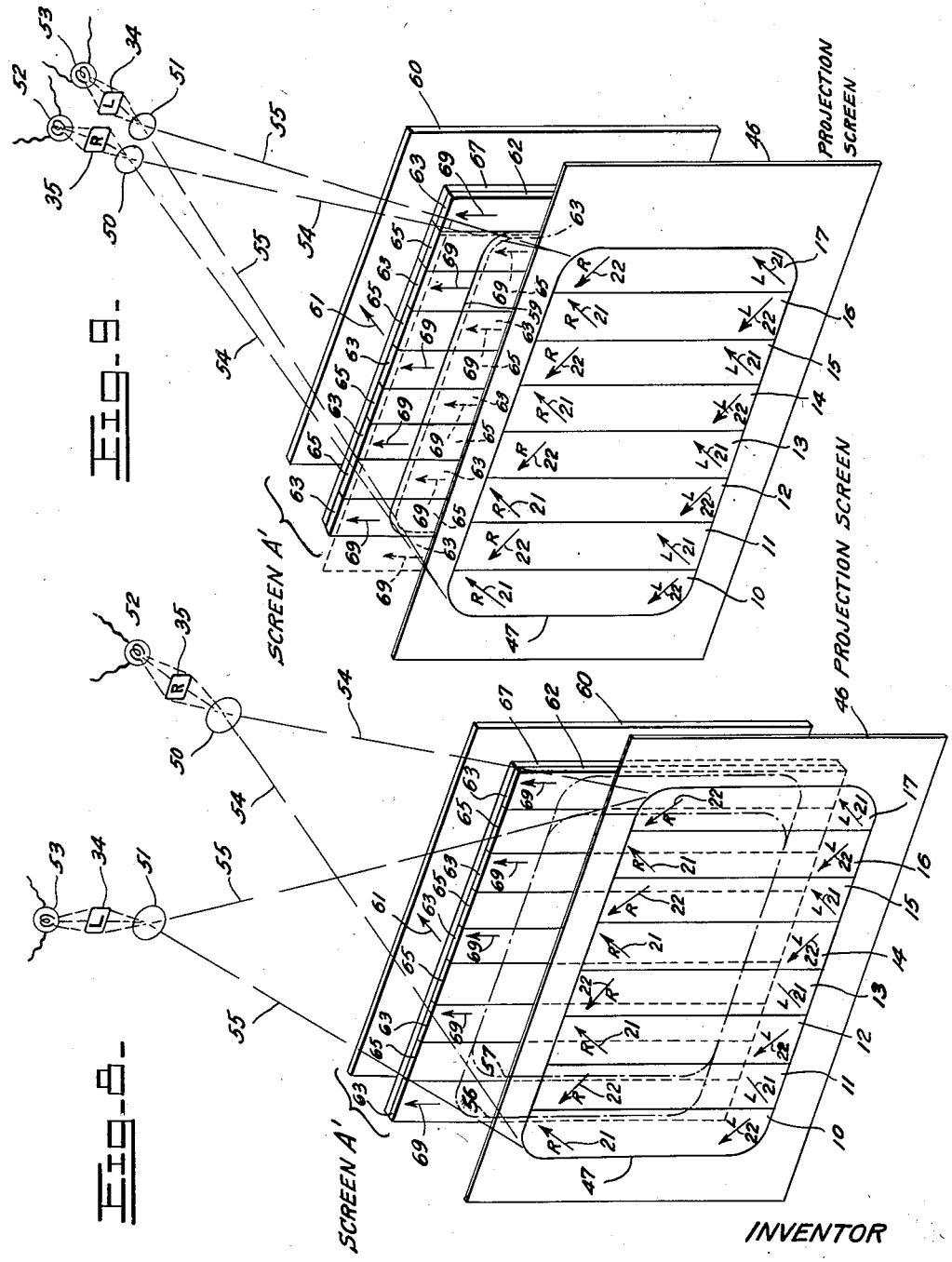

Patented Mar. 17, 1953

2,631,496

UNITED STATES PATENT OFFICE 2,631,496

STEREOSCOPIC VIEWING METHOD AND APPARATUS

Miles P. Rehorn, Nashville, Tenn.

Application August 8, 1947, Serial No. 767,569

23 Claims. (Cl. 88—29)

This invention relates to interlined or interareaed stereoscopic images and means for producing, reproducing and viewing the same stereoscopically.

More specifically, the invention relates to new and improved interlined stereoscopic images and stereograms of a particular and unique type; to means for producing and reproducing such stereoscopic images and stereograms; to means (comprising a screen or filter or a plurality of screens or filters) for viewing in three-dimensional relief such stereoscopic images and stereograms without the use of personalized aids such as lenses or spectacles.

The principal object of this invention is to provide a stereoscopic method whereby an image of a particular form may be viewed by a group of people at the same time in full complete and satisfactory three-dimensional relief without the use of personalized auxiliary aids such as lenses or spectacles; such stereoscopic method being applicable to all phases of photography such as motion pictures either for home, auditorium or theater, still projections, snapshots, photographs or portraits of any desired size, magazine publications, displays, billboards and other similar advertisements, stereoscopic drawings, and television images, the stereoscopic images and viewing in all of these different applications being possible in either black and white, or light and dark contrast, or in color.

More specifically, the invention provides means for producing and reproducing new and improved interlined stereoscopic images and stereograms (either in black and white or in color) of a particular and unique type, and means comprising a bar type filter or screen or a plurality of such filters or screens for viewing in three-dimensional relief such stereoscopic images and stereograms without the use of personalized aids such as lenses or spectacles.

Another object of this invention is to provide a bar type screen as a means for three-dimensional viewing, whose strips or bars are practically invisible regardless of whether the bar areas are wide or extremely narrow due to the fact that the screen contains no opaque bars but only transparent bars or strip areas.

Another object of this invention is to provide a bar type screen as a means for accomplishing three-dimensional views which, due to its nature, permits a view of the entire image surface or projection screen by each of the two eyes of an observer without intermittent movement of either the bar screen, image surface or projection screen.

A further object of this invention is to provide a new and improved interlined stereoscopic image of a particular and unique nature in combination with a bar type screen as a means for viewing said image in three-dimensional relief, both the image and the viewing screen being of such a nature as to permit to each of the two eyes of an observer complete respective views of the two stereo images in their photographically or pictorially complete and original aspects without intermittent movement of either the bar screen, image surface or projection screen, and without intermittent appearance of either of the two stereos or any part thereof, and so viewed without the use of auxiliary or personalized aids.

Another object of this invention is to provide means whereby the image may be produced and viewed in the manner above indicated regardless of whether it is a projected image, as in motion pictures, a scanned and projected image as in television, or a transparent light-polarizing image, whether projected, viewed directly against a light source or against a reflecting backing.

A further object of this invention is to provide a new and improved interlined stereogram of a particular and unique type of such a nature that it may be viewed either as a motion picture or still projection, as a transparency against a light source or against a reflecting backing in combination with a bar type screen particularly adapted for use as a means for viewing such a stereogram or its projected image in three-dimensional relief without the use of personalized aids such as lenses or spectacles, both the stereogram and the viewing screen being of such a nature as to permit to each of the two eyes of an observer complete respective views of the two stereo images in their photographically or pictorially complete and original aspects without intermittent movement of either the bar screen, image surface or surfaces, or projection screen, and without intermittent appearance of either of the two stereos, forming the stereogram, or any part thereof.

Another object of this invention is to provide means for producing and reproducing new and improved interlined stereoscopic images and stereograms, characterized by absence of visible linear pattern, no impairing of the image quality resulting from their interlinear nature, the entire image area being occupied by both stereoscopically related images at the same time in a superimposed manner, yet when viewed through the transparent bar type screen, which this invention also provides for that purpose, perfectly clear, complete and satisfactory three-dimensional views are obtained.

Another object of this invention is to provide methods of receiving a stereoscopically related pair of television images either in dark and light, or in color, so that they may be viewed in proper three-dimensional relief by means of one or more of the bar type screens provided by this invention for that purpose, without auxiliary personalized aids such as lenses or spectacles.

Another object of this invention is to provide a modification of the first-mentioned stereoscopic method which may be readily applied to any motion picture theater (with certain necessary changes and additions of equipment) in such a way that an observer in any seat in the theater, from the upper balcony right to the front row left or vice versa, may obtain satisfactory three-dimensional views without wearing any kind of personalized aids such as spectacles, lenses or filters, and without any inconvenient or distasteful adjustment of equipment in order to obtain such views.

Other objects of the invention will appear hereinafter.

Referring to the accompanying drawings:

Fig. 7 is a schematic representation of a method of producing the image of Fig. 1 by projection.

Fig. 8 is a schematic representation of another method of producing the image of Fig. 1 by projection.

Fig. 9 is a diagrammatic representation of an intermittent motion picture projection method of producing the image of Fig. 1.

Fig. 10 is a diagrammatic representation of a general method of producing the image of Fig. 1 by using retardation unit area action.

Figure 1:
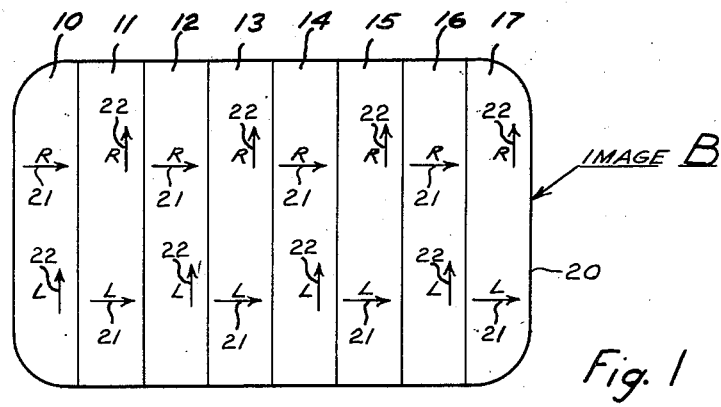
Fig. 1 is a schematic representation of a unique type image which constitutes one of the principal elements of this invention.

One of the principal elements of this invention is an interlined stereoscopic image of a particular and unique type. Such an image is therefore presented in the following description:

Fig. 1 is a schematic representation of the appearance of the image in one of its preferred forms. Accordingly therefore it is an image comprising strip or pathlike unit image areas appearing in alternately cross polarized light in the manner presented in the following description. The term "interareaed" is herein used to define an image comprised of such strip or pathlike unit areas.

As shown in Fig. 1, each of the unit areas 10–17 of the image is composed of two companion superimposed stereoscopic views L and R formed by light which is polarized in horizontally and vertically contrasted directions 21 and 22.

Considering one of these composite unit image areas, as for example 13, it will be noticed that the light bearing the right eye stereo view R is polarized in a vertical direction 22 and at right angles to the horizontal direction 21 of the light emanating from either of the adjacent unit areas 12 or 14 which is bearing an adjacent unit view R of the same stereo.

Similarly, considering the same area 13, the light bearing the left eye stereo unit view L is polarized in a horizontal direction 21 and at right angles to the vertical direction 22 of the light emanating from either of the adjacent unit areas 12 or 14 which is bearing an adjacent unit view L of the left eye stereo.

The above described relationship, between unit views and their respective directions of polarization, holds for any given unit image area when considered in connection with its adjacent image areas.

Whereas ordinarily the preferred directions of polarization in which the unit views appear in contrast are horizontal and vertical, it is to be understood that other directional contrasts are included within the scope of this invention, such as a diagonal right angled contrast, or a straight line direction in contrast with a circular or elliptical direction, or a clockwise, circular or elliptical direction contrasted with a counterclockwise, circular or elliptical direction.

Although the preferred pattern form of the image has been described (comprising interlined vertical strips) it is to be understood that other pattern forms, such as one comprising slanting or diagonal strips or such as a checkerboard pattern or a Chinese checkerboard pattern comprising unit square, triangular, hexagon shaped, circular or other shaped unit areas, also fall within the scope of this invention.

It will be noted that, as shown in Fig. 1, unlike the well known ordinary bar type stereoscopic image where right eye views can exist only in between left eye views (except by complicated intermittent action), each of the pair of stereoscopically related images R and L occupy, in all of their photographic or pictorial completeness, the entire image area 20, none of the image quality being sacrificed to interlining.

The unit image areas appearing in contrastingly polarized light are preferably substantially equal in size or in their horizontal widths.

The unit contrastingly polarized light areas and the unit image areas, though existing, do not appear to the naked eye as individual units or defined areas, but may be detected through a single light polarizing filter.

Even if such unit areas appear only intermittently, the complete image will still appear by persistence of vision (as described later) provided the intermittent appearance is such that the unit views and directions of light polarization exist in the proper and necessary relationship to each other.

Throughout descriptions to follow, this particular and unique type inter-areaed stereoscopic image, which constitutes a principal element of this invention, will be referred to for the sake of brevity as image B. Also, all drawings representing image B will show said image in its preferred pattern form, but it will be understood that other pattern forms are meant to be included in the representation.

Figure 2:
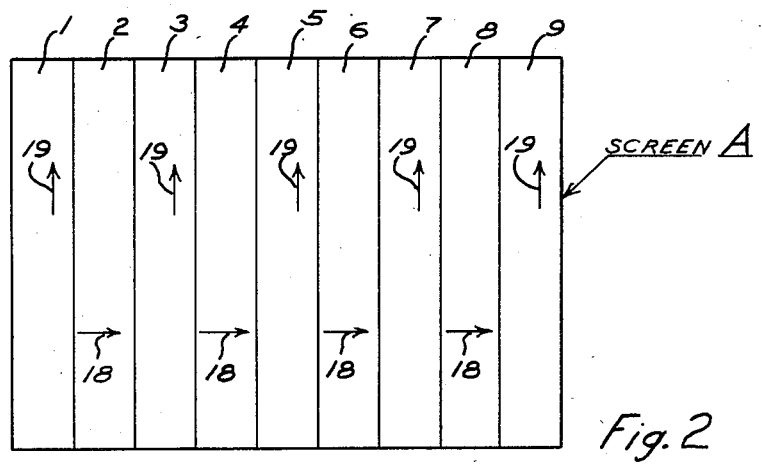
Figs. 2 and 3 are schematic representations of two different forms of the interlined screen or filter which constitutes another of the principal elements of this invention.

Another principal element of the invention is a screen or filter of a particular and unique type. Fig. 2 represents one of the preferred forms of this screen, namely one comprising a plurality of vertically interlined cross-polarized light-polarizing strips or bars defining areas of substantially equal width (as 1, 2, 3, 4, 5, 6, 7, 8 and 9). Every other light-polarizing bar area (as for example 2, 4, 6 and 8) polarizes light in a substantially horizontal direction, as indicated by arrows 18, and every other light polarizing bar area (as for example 1, 3, 5, 7, and 9) polarizes light in a substantially vertical direction, as indicated by arrows 19.

Whereas ordinarily the preferred directions of polarization, in which the unit polarizing media are in contrast, are horizontal and vertical, it is to be understood that other directional contrasts are included within the scope of the above described screen, such as a diagonal right angled contrast, or a straight line direction in contrast with a circular or elliptical direction, or a clockwise circular or elliptical direction contrasted with a counterclockwise circular or elliptical direction.

Figure 3:
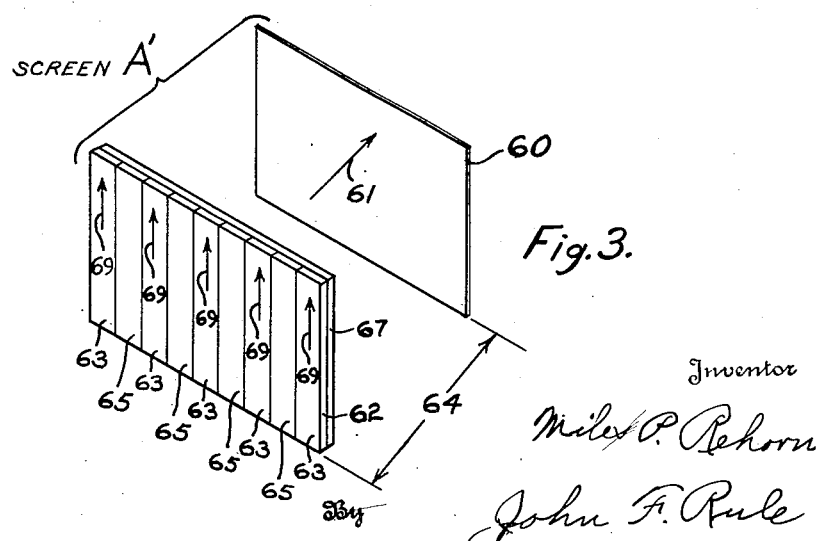

Fig. 3 is a schematic representation of a modified form of the screen of Fig. 2. This modified form of the screen is composed of two principal elements: One is a light polarizing filter area 60 which has a single polarizing axis (indicated by arrow 61) extended at an angle of 45 degrees to the left or right of vertical throughout said area. This may be a sheet of light polarizing plastic or light polarizing glass. The other principal element 62 comprises a plurality of unit strip or bar areas 63 composed of retardation material (in this instance sheet Cellophane .001" thick) each having its principal optical direction, indicated by the arrow 69, angled at substantially 45 degrees to the axis of polarization 61 of said filter area 60. The retardation areas 63 and the neutral elements or spaces 65 between them are all preferably of equal widths. Said retardation element 62 will be positioned preferably in a plane parallel to the plane of the filter area 60.

As a matter of convenience, the element 60 may serve as a supporting medium for the unit retardation strips 63 of the element 62. Thus the elements 60 and 62 would be combined so as to touch each other. However it is not necessary that the elements 60 and 62 be close together. They may be separated an arbitrary distance 64 so long as practical. For regardless of this distance the action is the same: Light having passed through the element 60 is vibrating in only one linear direction. But when it reaches the element 62, the part of the light that passes through the unit strips of Cellophane 63 is changed so that it now vibrates in a direction at right angles to that of its original vibration. But the remainder of the light continues to vibrate in its original direction. Thus the light is now cross polarized in a manner similar to that described in connection with the screen of Fig. 2.

However, if the unit retardation strips 63 are not supported by the element 60, some other suitable transparent support 67 (which is non-polarizing and non-depolarizing) such as plate glass or Lucite must be used.

Cellophane is by no means the only retardation material which may be used in forming the element 62. Any transparent retardation material may be used which possesses the correct degree of birefringence to rotate the plane of polarization of linearly polarized light through 90°. Other retardation material may be used which changes plane polarized light into circularly or elliptically polarized light.

It is to be understood that, although the preferred pattern form of the screen of Figs. 2 and 3 has been described, other pattern forms, such as one comprising slanting or diagonal strips or such as a checkerboard pattern (or a Chinese checkerboard pattern) comprising unit square, triangular, hexagon shaped, circular or other shaped unit areas, also fall within the scope of this element of the invention.

There are various forms the screens may take as related to use. They may be large, of sufficient size to be placed before a large projection of image B, or lengthened to be placed before all the rows of seats in a theater, against a store window, or billboard for viewing image B in three-dimensional relief as it may appear in other aspects of this invention. Or they may be in a diminished size to be used before snapshots or portrait sizes of image B. Or they may be in a still further diminished size to be used as filters for projection purposes, duplicating or photographic printing purposes, or to be built into a revolving drum or otherwise used in connection with stereoscopic television methods. They may be made thick or thin (from ¼" or more to .0003" or less) with light polarizing or retardation unit areas, wide or extremely narrow, large or extremely small.

There are also various forms the screens may take relative to methods of manufacture. The screen of Fig. 2 may be composed of a plurality of unit light polarizing elements made of light polarizing glass or of light polarizing plastic sheets. Or it may be composed of a plurality of elements or parts made of glass or plastic sheets, each element containing a plurality of light polarizing areas directionally contrasted as regards axes of polarization. Or it may be composed of only one element, part or piece, that is, a single sheet of glass or sheet plastic which has been processed in such a way as to contain a plurality of light polarizing unit areas properly contrasted as regards direction of axes of polarization. The screen of Fig. 3 may be composed of a plurality of elements comprising one or more neutral polarizing sheets in combination with retardation unit areas. Or it may be a single sheet comprising a polarizing surface, and a surface composed of unit retardation areas and neutral areas.

Two methods of manufacturing the screen of Fig. 2 are described respectively in U. S. patents Carnahan No. 2,385,687 September 25, 1945, and Athey et al. No. 2,317,875 April 27, 1943.

Throughout descriptions to follow, these particular type screens (Fig. 2 or 3) composed of interlined or inter-areaed alternately contrasted (as regards vibration direction of the transmitted light) unit areas, and which screens constitute principal elements of the invention, will be referred to respectively (for the sake of brevity) as screen A (or filter A) and screen A' (or filter A').

Also all drawings representing the screens A or A' will show said screens in their preferred pattern forms, such as shown in Figs. 2 and 3.

Figures 4, 5:
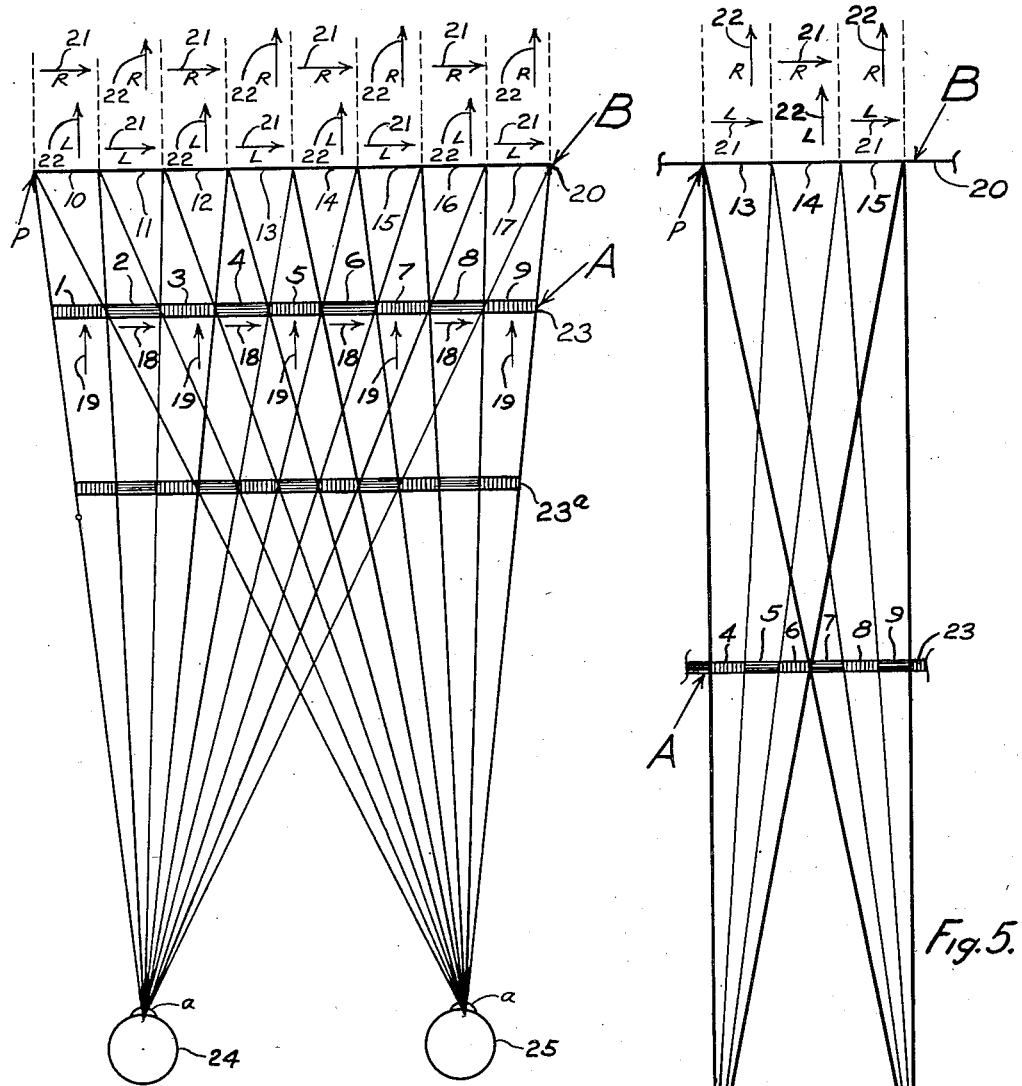
Fig. 4 is a schematic view of a combination of the image with the screen which permits three-dimensional views by an observer.
Fig. 5 is a fragmentary view showing another position which the screen may take relative to the image.

Fig. 4 (a plan view of screen A, Fig. 2 and image B, Fig. 1) is a schematic representation of the position in which the screen is to be placed before the image in order to obtain the desired stereoscopic view. Screen A will be placed in the vertical plane 23 before image B which is in a plane 20 preferably parallel to the screen. The screen is also positioned between said image plane and the viewpoint of an observer, and preferably at such a distance from said image plane that the angle from a point P at the image plane 20 subtended by the eyes 24 and 25 of an observer, approximates the angle from said point that is subtended by the horizontal width of one of the light polarizing unit areas (as for example 1) of screen A. The widths of the unit areas of the image and screen, for example units 1 and 2, are so proportioned that, with the parts positioned as just described, the angle from the pupil (a) of either eye 24 or 25 of an observer subtended by the horizontal width of one of the unit areas (as for example 2) of the screen will likewise be approximately subtended by the horizontal width of one of the unit image areas of image B.

With the screen and image so positioned relative to each other, an observer may slightly move his head in a horizontal direction either to the left or right until he reaches one of the various points at which the desired stereoscopic view may be obtained. Or screen A may be adjusted to the eyes of an observer by moving it slightly in a horizontal direction before image B.

Also screen A may be adjusted in such a way as to permit each of a plurality of observers seated side by side to obtain three-dimensional views from several positions of the head as they are so seated; that is, each one may obtain the desired stereo view from the center of his seat or as he leans resting from side to side.

The action is clearly shown in Fig. 4 wherein it will be seen that the left and right eyes 24 and 25 of an observer looking through the light polarizing screen areas 7 and 8 respectively, both see the image area 16. But the right eye view R (of the area 16) which is polarized in a horizontal direction 21 is admitted only to the right eye 25 through the area 8 which has a horizontal polarizing axis 18, while said view is blocked out to the left eye 24 by the area 7 which has a vertical polarizing axis 19. Similarly the left eye view L (of the area 16) which is polarized in a vertical direction 22 is admitted only to the left eye 24 through the area 7 which has a vertical polarizing axis 19, while said view is blocked out to the right eye 25 by the area 8 which has a horizontal polarizing axis 18.

It will be noticed that both eyes 24 and 25 of an observer see through the light polarizing areas of screen A, and all of the plane of appearance of image B but, due to the unique interplay between the unit polarizing areas of the screen and the unit polarized views of image B, the right eye 25 sees only the complete right eye view, and the left eye 24 sees only the complete left eye view, the action being the same as that described above for any pair of unit areas of the screen when considered in combination with any proper unit area of the image B.

The unit areas of screen A and the unit areas of image B may be sufficiently narrow or small that said screen may be placed directly against the plane of appearance of said image (in such a case the screen may be the same size as the image or only slightly larger), or sufficiently wide or large that said screen may be moved away from the plane of appearance of said image a considerable distance. (In such a case the screen will be proportionately larger in area than the image.) The angle of view and viewing distance may vary, depending on the size of said screen and image, and the width of the unit areas of each.

Fig. 5 is a fragmentary schematic view showing another position in which screen A may be placed before image B which also permits the desired three-dimensional view. This position differs from that shown in Fig. 4 only in one respect, namely that in this instance screen A is spaced at such a distance from image B that the angle from a point P at the image plan 20 subtended by the eyes 24 and 25 of an observer approximates the angle from said point which is subtended by the horizontal width of three of the light polarizing unit areas (as for example 4, 5 and 6) of screen A. However, the action differs slightly from that shown in Fig. 4 in that a given unit image area (as for example 15) is not seen through two adjacent unit areas of the screen as was the case with the area 16 in Fig. 4; instead such an image area as 15 is seen by both eyes 24 and 25 of an observer as the lock respectively through a pair of polarizing areas (as for example 6 and 9) of the screen, said pair being separated by the width of two other unit areas, as 7 and 8.

There are other arrangements of the screen relative to the image, by which the desired stereo view is obtained. Various positions are possible as long as the angle from a point P subtended by the eyes of an observer is also approximately subtended by an odd numbered adjacently arranged group of unit areas of the screen.

The screen A' (Fig. 3) may be substituted for the screen A in Fig. 4, being similarly positioned before image B at the plane 20, with identical viewing results. The unit areas 63 and 65 of the retardation element 62 then take the place of the unit polarizing areas of the screen in Fig. 4 in the matter of registration with the unit view areas of image B and in the matter of interocular action. Also the polarizing filter 60, Fig. 3, must be positioned between the retardation area 62 and an observer.

The width of unit areas of image B is always proportionately greater than that of the unit areas of screen A, Fig. 2, or A', Fig. 3, the amount of increase in width or size depending on the selected viewing distance and the distance between said screen and image.

If other pattern forms of screen A (or A') and image B are used rather than the preferred ones, it will of course be necessary that their pattern forms correspond. In such cases the action is identical for each inter-related horizontal row of unit areas of screen and image as that described above for the rows of vertical strips or bars composing the screen and image in their preferred pattern forms.

The most tangible and permanent form in which image B, Fig. 1, may be produced is as a light polarizing image. Light polarizing images are now a commercial item, and a full and complete description of such images, likewise of the film for receiving them, may be had by referring to U. S. patents to Land, Nos. 2,289,714 July 14, 1942; 2,315,373 March 30, 1943; and 2,380,363 July 10, 1945, and the pamphlet entitled "Polarized Light and its Application," a publication copyrighted 1945 by the Polaroid Corporation.

Such a film, as disclosed in U. S. patent Land No. 2,380,363 July 10, 1945, may have the molecules forming either one or both of its surfaces oriented to an appreciable depth in substantial parallelism in a direction either perpendicular, parallel or diagonal to an edge of the sheet, the remainder of the sheet having molecules substantially disoriented. The orientation of opposite surfaces may be either in the same or contrasting directions.

There are various projection methods of producing image B, Fig. 1, including still, motion picture and television projections.

One of the preferred methods is schematically represented in Fig. 7 where a pair of ordinary stereo film positives 34 and 35 are shown in proper position for being projected respectively through a pair of filters A', shown as circles but otherwise identical with the screen A', Fig. 3. Light from the sources 52 and 53 illuminates the images 34 and 35 by means of the well known condenser lens (omitted for clarity), and the images are propagated through the filter A' and are thereby polarized and superimposed on a non-depolarizing screen 46 suitable for receiving such polarized images. The pair of images 34 and 35 are so positioned respectively relative to the filters A' that the projected images 47 are superimposed on the projection screen 46 in the strip pattern as shown, to form the image B. Thus for the right eye view the light from the source 52 passes first through the polarizing element 60 and is polarized in the direction of arrow 61, and then through the element 62 with its alternate retardation strips 63 and neutral spaces 65, so that the right eye image on the projection screen 46 comprises strip sections polarized in the direction shown by arrows 21 (the same direction as 61) alternating with strip sections in which the axis of polarization has been rotated through 90 degrees by the retardation elements 63 as indicated by arrows 22. The left eye image is polarized and projected on the screen 46 in the same manner as the right eye image, the two images being superimposed, but with the direction of polarization of each strip unit L of the left eye view at right angles to or in a contrasting direction to that of the superimposed right eye unit. The resulting composite image on the non-depolarizing projection screen 46 is the image B of Fig. 1.

By substituting a pair of stereo television images appearing respectively on the faces of a pair of projection type receiving tubes (for the light sources 52 and 53 and film images 34 and 35) image B, Fig. 1 may thus be produced on the projection screen of a television receiving set. The right and left eye views either of a subject or of a film record may be transmitted in such a manner by modern television methods that they may be made to appear on the faces of the receiving tubes either simultaneously or intermittently.

Another projection method is schematically represented in Fig. 8 where a pair of ordinary stereo film positives 34 and 35 are shown being illuminated by light sources 52 and 53 and projected through a pair of projection lenses 50 and 51. The screen A' and the projection screen 46 are in parallel planes, spaced apart, with the screen A' interposed between the screen 46 and the projection lenses. The stereo films 34 and 35 are projected through the screen A' and superimposed on the projection screen 46, thereby forming the composite image B. Lines 54 indicate the path of the projection beam bearing the right eye image 35, and the lines 55 indicate the path of the projection beam bearing the left eye image 34. At the screen A', the projections of the two images subtend overlapping areas 56 and 57, one displaced relative to the other in a direction lengthwise of the screen a distance equal to the width of one unit strip 65 or 63, but other displacement distances equal to three, five or any other odd number of adjacent unit strips of the screen A' are possible.

Geometrically, the positions of the projection lenses 50, 51, the screen A' and the screen 46 relative to each other are identical with those of the screens and the eyes of the observer as shown in Fig. 4, as heretofore described.

By simply substituting a pair of projection type television receiving tubes for the combinations 53 and 34, 52 and 35, the application of this method to television is obvious. Projection screen 46 will become the television screen. The right and left eye views either of a subject or of a film record may be caused to appear on the respective faces of the receiving tubes either simultaneously or intermittently.

Fig. 9 is a schematic representation of another method (a motion picture method) of producing image B, Fig. 1, in which a pair of ordinary stereo film positives 34 and 35 are shown being illuminated by light sources 52 and 53 (using the well known condenser lens which is omitted for clarity) and projected respectively through the projection lenses 50 and 51. Lines 54 indicate the path of the projection beam bearing the right eye image 35, and lines 55 indicate the path of the projection beam bearing the left eye image 34. The two images are projected intermittently through the screen A' (identical with the screen of Fig. 3) in superimposed relationship to each other; they also fall on the non-depolarizing screen 46 in such relationship. But although thus passing through the same space plane area 58 or 59 at the screen A', the areas 58 and 59 are not entirely identical when considered as areas of the screen for, by means of a mechanical drive including a motor, said screen moves back and forth (horizontally) in timed relationship with the alternately appearing images a distance equal to the width of a unit strip 63 or 65 of the filter, namely, from the full line position to the dotted line position. While the screen A' is in its first (full line) position, the left eye image 34 passing through the area 59 (full lines) of said screen in this position is cross polarized into unit views L of the projection 47. Then shutter action in the projector cuts off the projection of the image 34 and admits the projection of the right eye image 35. During this change the screen A also moves to its dotted line position, and said right eye image 35 passing through the area 58 (dotted lines) of said screen in this position is divided into the cross polarized unit views R of the projection 47. The intermittently projected images 47, combined by persistence of vision, are identical with image B, Fig. 1. The screen A' is preferably positioned in a plane parallel with the projection screen 46 and nearly against said screen.

A modified form of this method is that in which a single film containing alternate right and left eye views in a vertical row passes through the film gate of a single projector with a single projection lens, for example one including the light source 53 and lens 51.

By substituting a pair of projection type television tubes respectively for the combinations 35 and 52, 34 and 53, Fig. 9, the application of the above method to television is obvious.

Or the modified method above described, using a single projector, may be applied to television by substituting one television tube (either projection or direct viewing type) for the single projector. Intermittently appearing stereo images on the face of the tube will take the place of the alternate right and left eye film frames passing intermittently through the film gate. A vertically revolving drum, containing a plurality of small screens A (Fig. 2), arranged vertically end to end around the drum so that the alternating screens correspond with the above described alternating positions of the screen A', Fig. 9, may be found to be more practical than such a horizontally moving screen. Shutter action may be separate, or combined on the drum with said plurality of screens. In view of modern television methods, the transmission of such intermittently appearing stereo images presents no problem.

In the above described methods, illustrated in Figs. 8 and 9 respectively, image B appearing on the projection screen may be viewed stereoscopically through the same screen A', through which the stereo pair is being projected, using the ordinary forward method of projection onto an opaque screen.

Although screen A', Fig. 3 is referred to as being used in the above projection methods, it is to be understood that screen A, Fig. 2 may also be used with similar results. If screen A', Fig. 3 is used, it is important that the retardation element 62 be positioned between the polarizing sheet 60 and the projection screen.

A form of the invention which comprises a versatile and simplified method of producing image B, Fig. 1, is schematically represented in Fig. 10. This method is a general one, applicable to projected images, light polarizing images or to scanned (or scanned and projected) images, as in television. The means for producing image B by this method consists of two principal elements. One comprises a pair of stereoscopically related images R and L (at 72 and 75) appearing in superimposed relationship to each other at the image plane 71, also appearing either in cross polarized light or as cross polarized light polarizing images. The axes of polarization of the pair of images are preferably at right angles to each other and extended in a direction at 45 degrees to the left and right of vertical, as indicated by the arrows 73 and 74. The other principal element 82 (identical with 62 of Fig. 3) comprises a plurality of retardation strips 77 (referred to as unit strips) and spaces 83. If the element 82 is separated from the image plane 71, said element will be supported by a transparent non-polarizing and non-depolarizing sheet 78 such as polished plate glass or Lucite. But if said element is to be placed against the image plane 71, it may be supported by the material which forms the image plane itself.

The directions of polarization, of the right and left eye views passing through the spaces 83, remain identical with directions 73 and 74. But the axes of polarization of the unit views passing through the retardation areas 77 are reversed, being rotated through 90 degrees. Thus image B84 (identical with Fig. 1 with the exception of the directions of polarization of unit views) is formed at the retardation plane 82. For clarity, image B84 is shown removed from its actual position 84a.

Image B84 appears at said retardation plane 82 regardless of whether said plane is separated from the image plane 71 an arbitrary distance 80 or is touching said image plane. The plane in which the retardation element 82 will be positioned before the image plane 71 need not be parallel with said plane.

Image B84 is viewed stereoscopically by placing screen A, Fig. 2, or A', Fig. 3 before it in the manner previously described and indicated in Fig. 4. However, if the screen of Fig. 2 is used, the polarizing axes of unit areas must be respectively at 45 degrees to the left and right of vertical. Also if the screen of Fig. 3 is used, and sheet Cellophane is the retardation material employed in the combination, the principal optical axes 69 of the Cellophane strips 63 Fig. 3 should be at right angles to the principal optical axes 79 of the Cellophane strips 77 of the element 82, Fig. 10. In either case said viewing screen may be permanently registered with the unit areas 77 and 83 of the element 82 before image B actually appears. Thus a combination of said screen (either A or A') with element 82 is formed which may be placed near the image plane 71 (or at an arbitrary distance from it) accommodating a group of observers. Or it may be individualized as before each observer in a theater, permitting a perfectly satisfactory three-dimensional view regardless of where the observer may be seated.

Cross polarized images (such as described above and indicated at the image plane 71) in the form of light polarizing images are now a commercial item and are described in U. S. patent, Land, No. 2,289,714 July 14, 1942. These images may be prints or transparencies to be viewed against a reflecting backing or light source, or they may be slides, or frames of motion picture film, to be projected onto a non-depolarizing screen.

Also by using a pair of ordinary stereo projection slides or a pair of stereo motion picture films and two projectors, it is easy to produce such cross polarized projected images by simply projecting each slide or film through a separate plane polarizing filter. The polarizing axes of the two filters will of course be crossed at right angles to each other.

Or a single motion picture projector, and a single film comprising alternate right and left eye views which are projected intermittently, may accomplish similar results by employing intermittent shutter and polarizing action. The shutter will close while frames are changed in the film gate as in the ordinary motion picture projector. But during this change there will also be a corresponding change of polarizing action by some mechanical means similar to that operating the shutter. For example, a pair of cross polarized filters may exchange places, or one filter be rotated through 90 degrees.

Or such cross polarized images may be produced on a television projection screen by simply substituting a pair of projection type television tubes and a pair of projection lenses for the pair of motion picture projectors. The right and left eye stereos must of course be transmitted stereoscopically, and a pair of plane polarizing filters with their polarizing axes properly crossed at right angles will be positioned respectively before the tube faces.

Or a single television tube (either of the projection type or direct viewing type) may receive an intermittently transmitted pair of stereo images; and by employing intermittent shutter and polarizing action (similar to that described for the above motion picture application, using the single projector and film) the cross polarized images may be made to appear (by persistence of vision) either on the television projection screen (if using a projection tube) or (if using a direct viewing tube) at the plane in front of the tube face occupied by the changing polarizing medium.

In the method of viewing image B presented in the foregoing description and schematically represented in Fig. 4, it is possible for an observer to mix parts of the pseudo stereoscopic view with parts of the genuine stereoscopic view, thus obtaining a somewhat distorted effect. This may be avoided by blocking out the mixed view. If screen A, Fig. 2, is used as the viewing medium, this may be done simply by placing an additional screen A (or it may be A', Fig. 3) between the eyes of an observer and the screen which is being used as the viewing medium. The width of the unit strips of this added screen will be proportionately narrower than those of the viewing screen in order that it may comply with the following specifications: Assuming that the viewing screen (or its unit strips) is in the preferred position 23, Fig. 4, this blocking-out screen will be preferably in the position 23a. This position is such that the angle from a point P at the image plane 20 subtended by the eyes 24 and 25 of an observer, and by one of the unit strips of the viewing screen (in position 23) is also subtended by three of the unit strips of said blocking-out screen (in position 23a); also such that the angle from either pupil (of the eyes 24 and 25 of an observer) subtended by a unit strip of image B is likewise subtended by one of the unit strips of the blocking-out screen (in position 23a). Other positions are also possible for this screen, such as one in which groups of five (or other odd number) of adjacently arranged strips of said blocking-out screen subtend the angle from a point P at the image plane 20, which is also subtended by the eyes of an observer.

Figure 6:
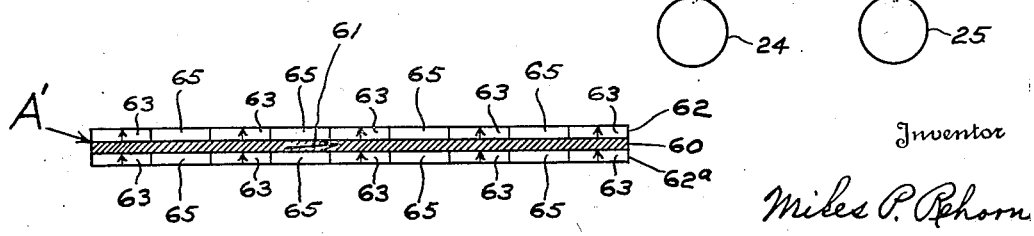
Fig. 6 illustrates the use of the screen of Fig. 2 as a means for blocking certain unwanted views of the image.

If screen A', Fig. 3, is used as the viewing screen, the mixed view may be blocked out in the same manner as that described above, with the exception that an additional retardation element, identical with 62, Fig. 3, will be required. Fig. 6 is a plan view of the screen A', Fig. 3 in combination with said additional retardation element 62a. The two elements 62 and 60 of Fig. 3 are here shown next to each other and in their proper relative positions to the added retardation element 62a. The element 62 is to be considered in the position 23 before image plane 20, Fig. 4, and still in combination with the elements 60 and 62a as shown in Fig. 6. When the cross polarized light, which is proceeding from image B and passing through the retardation element 62, has passed through the polarizing element 60, it is vibrating in only one direction indicated by the arrow 61. The additional retardation element 62a (having retardation and blank strips 63 and 65 substantially equal in width to the unit strips 63 and 65 of the retardation element 62) placed against the back of the element 60 divides this light (which now has a single direction of vibration) into cross polarized strips so that the interocular action is similar to that which obtains when screen A, Fig. 2 is used as the viewing medium. Therefore either screen A, Fig. 2 or screen A', Fig. 3 properly positioned will now block out the mixed view just as it did in the above described instance where screen A, Fig. 2 was used as the viewing medium.

In the various possible combinations of screens of different types and polarizing forms, with different forms of image B relative to directions of polarization, two rules must be followed in order to obtain best viewing results:

Wherever two retardation areas, such as 62, Fig. 3, are positioned between two polarizing media, the principal optical axis of the unit strips of one of the retardation elements should be at right angles to the principal optical axis of the unit strips of the other. This contrast is indicated by the vertical arrows 69 of the retardation element 62, Fig. 3, as compared with the horizontal arrows 79 of the retardation element 82 of Fig. 10.

Also the principal optical axis of any retardation element such as 62, Fig. 3, or 82, Fig. 10, will be directionally extended at an angle of 45 degrees to the directions of polarization of all polarized or polarizing media with which it is related or used. For example, if the principal optical axis of a retardation element is extended horizontally or vertically, then the directions of cross polarization of image B or the polarizing axis of any related polarizing medium will be respectively at 45 degrees to the left or right of vertical. But if said optical axis is at 45 degrees to the left or right of vertical, then the directions of cross polarization of image B or the polarizing axis of any related polarizing medium will be respectively vertically or horizontally extended.

And whereas the directions of polarization (of either unit image strips or of the unit strips of the screen A or A') are presented as being either horizontal or vertical, it is to be understood that other directions are included within the scope of the above modifications of this invention, such as diagonal, circular or eliptical directions of polarization.

Various forms of the screens and retardation devices herein disclosed and methods of making them are disclosed and claimed in my co-pending application Serial No. 767,567, filed August 8, 1947, Molecularly Aligned Sheet Material and Method of Manufacture.

Modifications, other than those herein described, may be resorted to within the spirit and scope of my invention.

I claim:

1. Means for presenting to the view of an observer at a viewing plane, a polarized composite stereoscopic view, said view comprising a complete right eye image view and a complete left eye image view, said complete views being in superposed relation to each other, each said complete view, with respect to directions of polarization, forming a pattern consisting of a multiplicity of adjacently disposed unit views arranged side by side in non-superimposed relation, the direction of polarization of each unit view being in substantial contrast to that of each adjoining unit view of the same complete view, and also in substantial contrast to that of the superimposed unit view of the other said complete view, each said unit view being polarized throughout its entire area in a single direction, the said means including a non-depolarizing sheet of material near the said viewing plane at which plane the said composite stereoscopic view appears, a pair of cross polarized stereoscopically related images superimposed at an image plane, and means for causing light passing from said images to be broken up into the said pattern of polarized unit views which comprise the said composite stereoscopic view, said last mentioned means including a light filtering device in cooperative relation to the said pair of images and to the said non-depolarizing sheet of material and comprising a multiplicity of unit retardation elements, the said elements of the said light filtering device forming a pattern corresponding to that formed by the said unit views of the said composite stereoscopic view.

2. The combination of a pair of stereoscopically related, cross polarized images superimposed at an image plane, and a transparent screen in front of said images, said screen comprising retardation material having its principal optical axis at an angle to the axes of polarization of said images such that polarized light directed from said images and passing through the retardation material has its axes of polarization rotated, said screen comprising strips of said retardation material spaced apart with intervening strip spaces through which the polarized radiation from the images passes without rotation of its axes.

3. Means for presenting to the view of an observer at a viewing plane, a polarized composite, stereoscopic view, said view comprising a complete right eye image view and a complete left eye image view, said complete views being in superimposed relation to each other, each said complete view comprising a multiplicity of adjacently disposed, substantially vertical, long and narrow rectangular unit strip views arranged side by side in a pattern with respect to their directions of polarization, in which the said strip views are in non-superimposed relation with the side edges of the individual unit strip views substantially coinciding with those of the adjoining unit strip views, the direction of polarization of each unit strip view being in substantial contrast to that of each adjoining unit strip view of the same said complete view, and also in substantial contrast to that of the superimposed unit strip view of the other said complete view, each said unit strip view extending in the direction of its length entirely across the complete view of which it is a part and being polarized throughout its entire area in a single direction, the said means comprising a non-depolarizing sheet of material at the said viewing plane, at which plane the said composite stereoscopic view appears, a pair of cross polarized stereoscopically related images superimposed at an image plane, and means for causing light which is furnished to said images to be broken up into the said pattern of polarized unit views which comprise the said composite stereoscopic view, said last mentioned means including a light filtering device in cooperative relation with the said pair of images and with the said non-depolarizing sheet of material comprising a polarizing sheet having a single direction of polarization and a multiplicity of unit vertical strip elements of retardation material forming a pattern corresponding to that formed by the said unit vertical strip views of the said composite stereoscopic view.

4. Means for presenting to the view of an observer at a viewing plane, a polarized composite, stereoscopic view, said view comprising a complete right eye image view and a complete left eye image view, said complete views being in superimposed relation to each other, each said complete view, with respect to directions of polarization, forming a pattern consisting of a multiplicity of adjacently disposed long and narrow unit strip views arranged side by side in non-superimposed relation, the direction of polarization of each said unit strip view being in substantial contrast to that of each adjoining unit strip view of the same complete view, and also in substantial contrast to that of the superimposed unit strip view of the other complete view, each said unit view extending in the direction of its length entirely across the complete view of which it is a part and being polarized in a single direction throughout its area and with its side edges extending entirely across the said complete view and being parallel with each other throughout said extension, the side edges of the individual unit strip views substantially coinciding with those of the adjoining unit strip views, the said means comprising a non-depolarizing sheet of material at the said viewing plane at which plane the said composite stereoscopic view appears, a pair of cross polarized stereoscopically related images superimposed at an image plane, and means for causing the light furnished to said images to be broken up into the said pattern of polarized unit views which comprise the said composite stereoscopic view, said last mentioned means including a light filtering device in cooperative relation to the said pair of images and to the said non-depolarizing sheet of material comprising a polarizing sheet having a single direction of polarization and a multiplicity of unit strip elements of retardation material forming a pattern corresponding to that formed by the said unit strip views of the said composite stereoscopic view.

5. The means defined in claim 1, and in combination therewith a second light filtering device positioned in front of the viewing plane and through which the said composite stereoscopic view is seen in stereoscopic relief, the said second light filtering device comprising light polarizing means, the polarization of said second light filtering device being in a pattern corresponding to said first mentioned pattern.

6. The means defined in claim 3, and in combination therewith a second light filtering device positioned in front of the viewing plane and through which the said composite stereoscopic view is seen in stereoscopic relief, the said second light filtering device comprising light polarizing means, the polarization of said second light filtering device being in a pattern corresponding to said first mentioned pattern.

7. The means defined in claim 4, and in combination therewith a second light filtering device positioned in front of the viewing plane and through which the said composite stereoscopic view is seen in stereoscopic relief, the said second light filtering device comprising light polarizing means, the polarization of said second light filtering device being in a pattern corresponding to said first mentioned pattern.

8. Means for presenting to the view of an observer at a viewing plane, a polarized composite, stereoscopic view, said view comprising a complete right eye image view and a complete left eye image view, said complete views being in superimposed relation to each other, each said complete view comprising a multiplicity of adjacently disposed, substantially vertical, long and narrow rectangular unit strip views arranged side by side in a pattern with respect to their directions of polarization, in which the said strip views are in non-superimposed relation with the side edges of the individual unit strip views substantially coinciding with those of the adjoining unit strip views, the direction of polarization of each unit strip view being in substantial contrast to that of each adjoining unit strip view of the same said complete view, and also in substantial contrast to that of the superimposed unit strip view of the other said complete view, each said unit strip view extending in the direction of its length entirely across the complete view of which it is a part and being polarized throughout its entire area in a single direction, the said means comprising a non-depolarizing sheet of material at the said viewing plane, at which plane the said composite stereoscopic view appears, a pair of stereoscopically related images, and means for causing light which is furnished to said images to be broken up into the said pattern of polarized unit views which comprise the said composite stereoscopic view, said last mentioned means including a light filtering device in cooperative relation with the said pair of images and with the said non-depolarizing sheet of material and comprising a multiplicity of unit vertical strip elements, the said elements of the said light filtering device forming a pattern corresponding to that formed by the said unit vertical strip views of the said composite stereoscopic view, the said light filtering device comprising a polarizing sheet having a single direction of polarization, and the said elements of the said light filtering device comprising strips of retardation material.

9. Means for presenting to the view of an observer at a viewing plane, a polarized, composite, stereoscopic view, said view comprising a complete right eye image view and a complete left eye image view, said complete views being in superimposed relation to each other, each said complete view, with respect to directions of polarization, forming a pattern consisting of a multiplicity of adjacently disposed long and narrow unit strip views arranged side by side in non-superimposed relation, the direction of polarization of each said unit strip view being in substantial contrast to that of each adjoining unit strip view of the same complete view, and also in substantial contrast to that of the superimposed unit strip view of the other complete view, each said unit view extending in the direction of its length entirely across the complete view of which it is a part and being polarized in a single direction throughout its area and with its side edges extending entirely across the said complete view and being parallel with each other throughout said extension, the side edges of the individual unit strip views substantially coinciding with those of the adjoining unit strip views, the said means comprising a non-depolarizing sheet of material at the said viewing plane, at which plane the said composite stereoscopic view appears, a pair of stereoscopically related images, and means for causing the light furnished to said images to be broken up into the said pattern of polarized unit views which comprise the said composite stereoscopic view, said last mentioned means including a light filtering device in cooperative relation to the said pair of images and to the said non-depolarizing sheet of material and comprising a multiplicity of unit strip elements, the said elements of the said light filtering device forming a pattern corresponding to that formed by the said unit strip views of the said composite stereoscopic view, the said light filtering device comprising a polarizing sheet having a single direction of polarization, and the said elements of the said light filtering device comprising strips of retardation material.

10. The combination of a pair of stereoscopically related, cross polarized images at an image plane, and a transparent screen in front of said images, said screen comprising retardation material having its principal optical axis at an angle to the axes of polarization of said images such that polarized light directed from said images and passing through the retardation material has its axes of polarization rotated, said screen comprising strips of said retardation material spaced apart with intervening strip spaces through which the polarizer radiation from the images passes without rotation of its axes.

11. The apparatus set forth in claim 10 and, in combination therewith, a filter screen positioned between the first mentioned screen and the viewing point of an observer and comprising light polarizing strips in a strip pattern corresponding to that of the first mentioned screen.

12. The means defined in claim 1, and in combination therewith a second light filtering device positioned in front of the viewing plane and through which the said composite stereoscopic view is seen in stereoscopic relief, the said second light filtering device comprising a polarizing sheet having a single direction of polarization and comprising a plurality of retardation elements.

13. The means defined in claim 3, and in combination therewith a second light filtering device positioned in front of the viewing plane and through which the said composite stereoscopic view is seen in stereoscopic relief, the said second light filtering device comprising a polarizing sheet having a single direction of polarization and comprising a plurality of retardation strips.

14. The means defined in claim 4, and in combination therewith a second light filtering device positioned in front of the viewing plane and through which the said composite stereoscopic view is seen in stereoscopic relief, the said second light filtering device comprising a polarizing sheet having a single direction of polarization and comprising a plurality of retardation strips.

15. Means for presenting to the view of an observer at a viewing plane, a polarized composite, stereoscopic view comprising a complete right eye image view and a complete left eye image view, said complete views being in superposed relation to each other and each comprising a multiplicity of unit views arranged in a pattern with respect to their directions of polarization in which pattern the unit views are in non-superposed relation, the direction of polarization of each unit view being in substantial contrast to that of each adjoining unit view of the same complete image view and also in substantial contrast to that of the superimposed unit view of the other complete image view, each said unit view being polarized throughout its entire area in a single direction, the said means comprising a pair of cross polarized stereoscopically related images superimposed at an image plane, and means for causing light which is furnished to said images to be broken up into the said pattern of polarized unit views which comprise the said composite view, said last mentioned means including a light filtering device in cooperative relation to the said pair of images and comprising a multiplicity of unit elements of retardation material in a pattern corresponding to that of said unit views of the composite stereoscopic view.

16. The method of presenting a pair of stereoscopically related, cross polarized views at an image plane and including a right eye view having its axis of polarization extending in one direction and a left eye view with its axis of polarization extending in a direction at right angles to that of the right eye view, and propagating said views from the image plane and reproducing them in a modified form with the views superimposed at a viewing plane, which method comprises rotating the axis of polarization of unit sections of the right eye view into the said direction of the axis of polarization of the left eye view and rotating the axis of polarization of the corresponding unit sections of the left eye view into the said direction of polarization of the right eye view, the said unit sections of each view alternating with unit sections in which the direction of polarization remains unchanged, whereby the views are reproduced in superimposed relation at the viewing plane, each including a complete polarized right eye view and a complete polarized left eye view, each consisting of unit sections having their axis of polarization in one said direction alternating with unit sections having their axis of polarization in the other said direction, and each right eye unit section being cross polarized with respect to the superimposed left eye unit section.

17. The method of propagating a pair of stereoscopically related, cross polarized views superimposed at an image plane and including a right eye view having its axis of polarization extending in one direction and a left eye view with its axis of polarization extending in a direction at right angles to that of the right eye view, and reproducing said views in a modified form with the views superimposed at a viewing plane, which method comprises rotating the axis of polarization of unit sections of the right eye view into the said direction of the axis of polarization of the left eye view and rotating the axis of polarization of the corresponding unit sections of the left eye view into the said direction of polarization of the right eye view, the said unit sections of each view alternating with unit sections in which the direction of polarization remains unchanged, whereby the views are reproduced in superimposed relation at the viewing plane, each including a complete polarized right eye view and a complete polarized left eye view, each consisting of unit sections having their axis of polarization in one said direction alternating with unit sections having their axis of polarization in the other said direction, and each right eye unit section being cross polarized with respect to the superimposed left eye unit section.

18. The method defined in claim 17, said method including screening from the right eye of an observer positioned at a viewing point in front of the viewing plane, the left eye view only, and from the left eye of the observer the right eye view only, and thereby presenting the complete right and left eye views in stereoscopic relief.

19. The method which comprises producing at an image plane a pair of superimposed cross polarized, stereoscopically related images, including a right eye image and a left eye image, projecting the images from the image plane to a viewing plane spaced from the image plane, rotating the axis of polarization of predetermined portions of the right eye image to the direction of polarization of the left eye image, said portions alternating with portions of the right eye image whose axis of polarization remains unrotated, and rotating the axis of polarization of the portions of the left eye image corresponding to the rotated portions of the right eye image, to the direction of polarization of said unrotated portion of the right eye image, said rotations being effected during said projection of the images, and thereby producing at the viewing plane a composite view comprising a complete right eye view made up of units each having its axis of polarization crossed with respect to that of the adjoining units, and a complete left eye view superimposed on the right eye view and made up of units each cross polarized with respect to the corresponding unit of the right eye view.

20. The method defined in claim 19, said method including screening from the right eye of an observer positioned at a viewing point in front of the viewing plane, the left eye view only, and from the left eye of the observer the right eye view only, and thereby presenting the complete right and left eye views in stereoscopic relief.

21. The combination of a pair of stereoscopically related, cross polarized images, and a transparent screen positioned to receive and transmit light directed thereto from said images, said screen comprising retardation material having its principal optical axis at an angle to the axes of polarization of said images such that polarized light directed from said images and passing through the retardation material has its axes of polarization rotated, said screen comprising unit elements of said retardation material spaced apart with intervening spaces through which the polarized radiation from the images passes without rotation of its axes.

22. The apparatus set forth in claim 21 and in combination therewith, a filter screen positioned between the first mentioned screen and the viewing point of an observer and comprising unit light polarizing elements in a pattern corresponding to that of the retarding elements of the first mentioned screen.

23. The apparatus set forth in claim 21 and in combination therewith, a filter screen positioned between the first mentioned screen and the viewing point of an observer and comprising a polarizing sheet having a single direction of polarization and comprising a plurality of retardation elements in a pattern corresponding to that of the first mentioned screen.

MILES P. REHORN.

REFERENCES CITED

The following references are of record in the file of this patent:

UNITED STATES PATENTS

| Number | Name | Date |
|---|---|---|
| 1,963,438 | Greensfelder | June 19, 1934 |
| 2,075,853 | Kanolt | Apr. 6, 1937 |
| 2,184,641 | Glanz | Dec. 26, 1939 |
| 2,203,687 | Land et al. | June 11, 1940 |
| 2,210,806 | Etbauer | Aug. 6, 1940 |
| 2,218,875 | Parsell | Oct. 22, 1940 |
| 2,256,093 | Land | Sept. 16, 1941 |
| 2,281,101 | Land | Apr. 28, 1942 |
| 2,285,792 | Bailey | June 2, 1942 |
| 2,301,254 | Carnahan | Nov. 10, 1942 |
| 2,307,276 | Keyzer | Jan. 5, 1943 |
| 2,309,879 | Willis | Feb. 2, 1943 |
| 2,317,875 | Athey et al. | Apr. 27, 1943 |
| 2,318,705 | Morgan | May 11, 1943 |
| 2,358,070 | Holmes et al. | Sept. 12, 1944 |
| 2,380,241 | Jelley et al. | July 10, 1945 |
| 2,385,687 | Carnahan | Sept. 25, 1945 |
| 2,397,272 | Land | Mar. 26, 1946 |
| 2,401,271 | Suner | May 28, 1946 |
| 2,410,104 | Rainey | Oct. 29, 1946 |

FOREIGN PATENTS

| Number | Country | Date |
|---|---|---|
| 489,888 | Great Britain | Aug. 5, 1938 |
| 682,493 | Germany | Oct. 16, 1939 |
| 514,426 | Great Britain | Nov. 8, 1939 |